(12) United States Patent  
Hashiba et al.

(10) Patent No.: US 7,154,202 B2
(45) Date of Patent: *Dec. 26, 2006

(54) MAGNETO GENERATOR

(75) Inventors: Mitsuharu Hashiba, Tokyo (JP); Nobuhiro Kihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/235,049

(22) Filed: Sep. 27, 2005

(65) Prior Publication Data

US 2006/0022545 A1    Feb. 2, 2006

Related U.S. Application Data

(63) Continuation of application No. 10/817,897, filed on Apr. 6, 2004, now Pat. No. 6,958,559.

(30) Foreign Application Priority Data

Jan. 6, 2004    (JP)    ............... 2004-001169

(51) Int. Cl.
    *H02K 7/02*    (2006.01)
(52) U.S. Cl. .......................... 310/74; 310/64
(58) Field of Classification Search .......... 310/74, 310/64, 52, 216, 217, 254
    See application file for complete search history.

(56) References Cited

U.S. PATENT DOCUMENTS

| 5,034,643 A | 7/1991 | Trian |
| 5,703,421 A | 12/1997 | Durkin |
| 6,137,198 A | 10/2000 | Kawamura |
| 6,495,936 B1 | 12/2002 | Kikuchi et al. |
| 6,573,629 B1 | 6/2003 | Morimatsu |
| 6,713,934 B1 | 3/2004 | Kanno |
| 6,958,559 B1 * | 10/2005 | Hashiba et al. ............... 310/74 |

FOREIGN PATENT DOCUMENTS

JP    2000-304488 A    11/2000

* cited by examiner

*Primary Examiner*—Darren Schuberg
*Assistant Examiner*—Nguyen N Hanh
(74) *Attorney, Agent, or Firm*—Sughrue Mion, PLLC

(57) ABSTRACT

A rise in temperature of magneto coils can be suppressed, thereby improving the electrical efficiency, service life and reliability thereof. A flywheel (3) has a cylindrical portion (4), and is rotatable about an axis of rotation A—A. A plurality of magnets (7) are mounted on an inner peripheral surface of the flywheel (3) so as to rotate therewith. A stator core (10) has a plurality of teeth (12) protruded outwardly in a diametral direction, and is disposed in opposition to the magnets (7). Conductive wires are wound around the teeth (12), respectively, to form magneto coils (11). The stator core (10) has a laminated core (15) formed of a plurality of magnetic sheet steel plates laminated one over another, and a pair of end plates (16, 17) disposed so as to sandwich opposite side surfaces of the laminated core (15). At least one of the pair of end plates (16, 17) is made of aluminum whose heat radiation is higher than the magnetic sheet steel plates.

9 Claims, 5 Drawing Sheets

MAGNETO GENERATOR

This is a continuation of application Ser. No. 10/817,897 filed Apr. 6, 2004. now U.S. Pat. No. 6,958,559. The entire disclosure of the prior application Ser. No. 10/817,897 is hereby incorporated by reference.

BACKGROUND OF THE INVENTION

1. Field of the Invention

The present invention relates to a magneto generator which generates electricity under the electromagnetic induction action of magnets and magneto coils in accordance with the rotation of a flywheel.

2. Description of the Related Art

In a known alternator, in order to suppress the generation of heat due to eddy currents, magneto coils are arranged on a laminated core which is formed by laminating a plurality of magnetic thin sheet steel plates one over another, and a plurality of permanent magnets, which are fixedly secured to an inner surface of an outer peripheral edge of a flywheel in a circumferentially spaced apart relation with respect to one another, are disposed on the outer peripheral sides of the magneto coils. A pair of hollow disk-shaped end plates comprising magnetic steel plates of high strength each having a thickness larger than that of each thin sheet steel plate are disposed on the opposite side surfaces, respectively, of the laminated core. The outer peripheral portion of each end plate is bent toward the magneto coil side so as to hold the magneto coils in place and to induce magnetic fluxes in the windings of conductive wires of the laminated core (for example, see a first patent document: Japanese patent laid-open No. 2001-275283).

In the alternator as constructed above, particularly in case of a magneto generator, the following problems arise. That is, heat generation due to hysteresis losses and eddy current losses are caused by alternating fields generated by the permanent magnets when the flywheel is rotating. In particular, at the L-shaped bent portion of each end plate, there are induced magnetic fluxes, and hence the density of magnetic fluxes is high, resulting in large hysteresis losses. On the other hand, heat generation due to eddy current losses becomes large because of the large thickness of each end plate. As a result, the temperature of the laminated core rises, in accordance with which the temperature of each magneto coil also increases, and hence the resistance value of each magneto coil increases, too. Thus, the temperature of each magneto coil rises due to the copper or ohmic loss thereof which is in proportion to the resistance value of each magneto coil, resulting in reduction in the electrical efficiency.

In addition, copper wires used for the magneto coils are each covered with an insulation film of a high polymer material. This poses another problem in that the service life and reliability of the magneto coils are reduced when the temperature of each magneto coil rises, with the high temperature state of the magneto coils being continued for a long time.

SUMMARY OF THE INVENTION

Accordingly, the present invention is intended to obviate the above-mentioned various problems, and has for its object to provide a magneto generator in which a rise in temperature of magneto coils can be suppressed, thereby improving the electrical efficiency of the generator as well as the service life and reliability of the magneto coils.

Bearing the above object in mind, according to the present invention, there is provided a magneto generator which includes: a flywheel having a cylindrical portion and being rotatable about an axis of rotation; a plurality of magnets mounted on an inner peripheral surface of the flywheel so as to rotate therewith; a stator core having a plurality of teeth protruded outwardly in a diametral direction and being disposed in opposition to the magnets; and magneto coils with conductive wires wound around the teeth. The stator core has a laminated core formed of a plurality of magnetic sheet steel plates laminated one over another, and a pair of end plates disposed so as to sandwich opposite side surfaces of the laminated core, and at least one of the pair of end plates is made of a metallic material whose heat radiation is higher than that of the magnetic sheet steel plates.

In the magneto generator as constructed above according to the present invention, at least one of the pair of end plates is formed of a metallic material whose heat radiation is higher than that of the magnetic sheet steel plates. As a result, the temperature rise of the magneto coils can be suppressed, so that the electrical efficiency of the magneto generator can be improved, and the service life and reliability of the magneto coils can also be improved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. The same or equivalent members and parts are identified by the same symbols throughout the following description of the various preferred embodiments and figures of the accompanying drawings.

Embodiment 1

Figure 1:
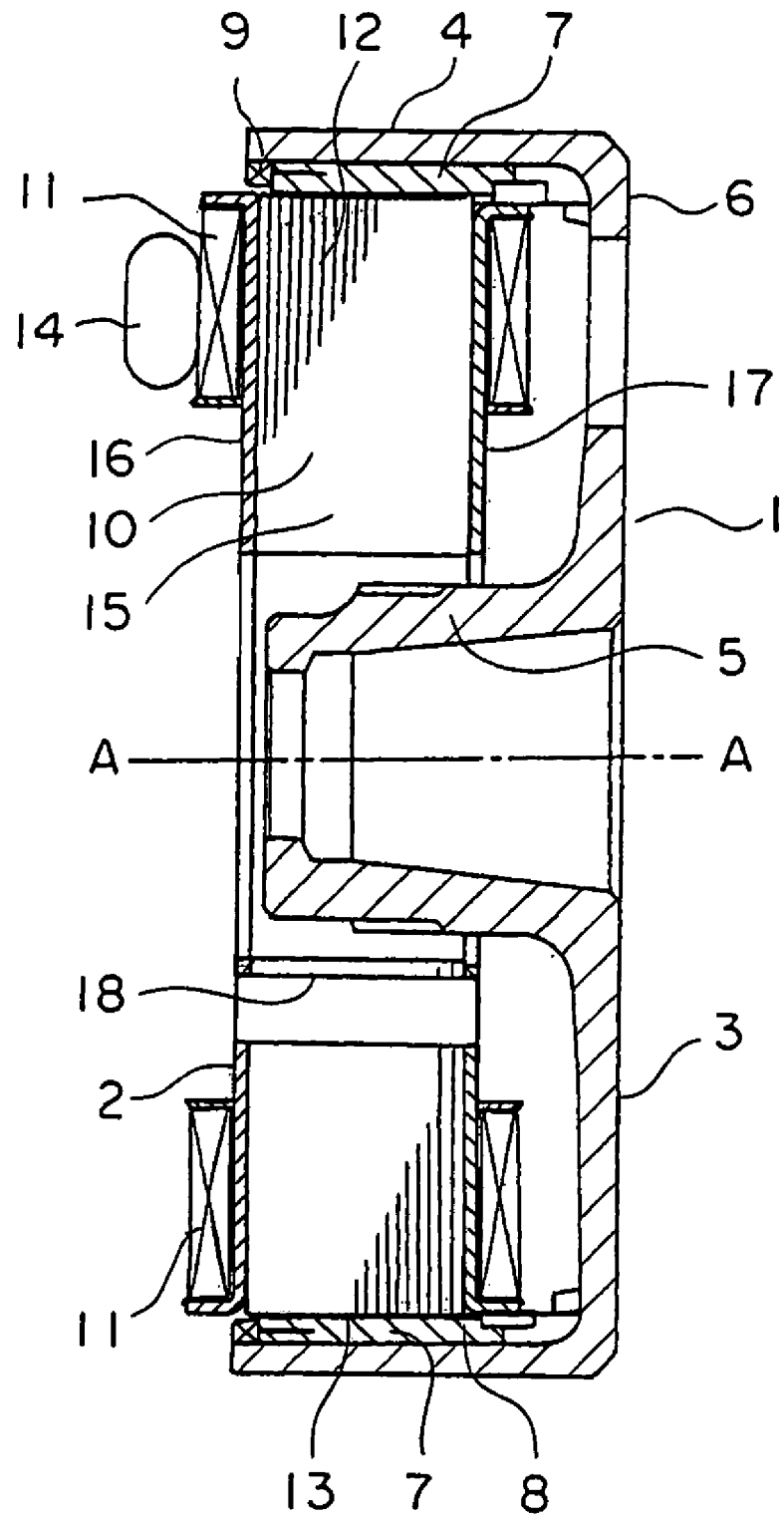
FIG. 1 is a vertical cross sectional view of a magneto generator according to a first embodiment of the present invention.
Figure 2:
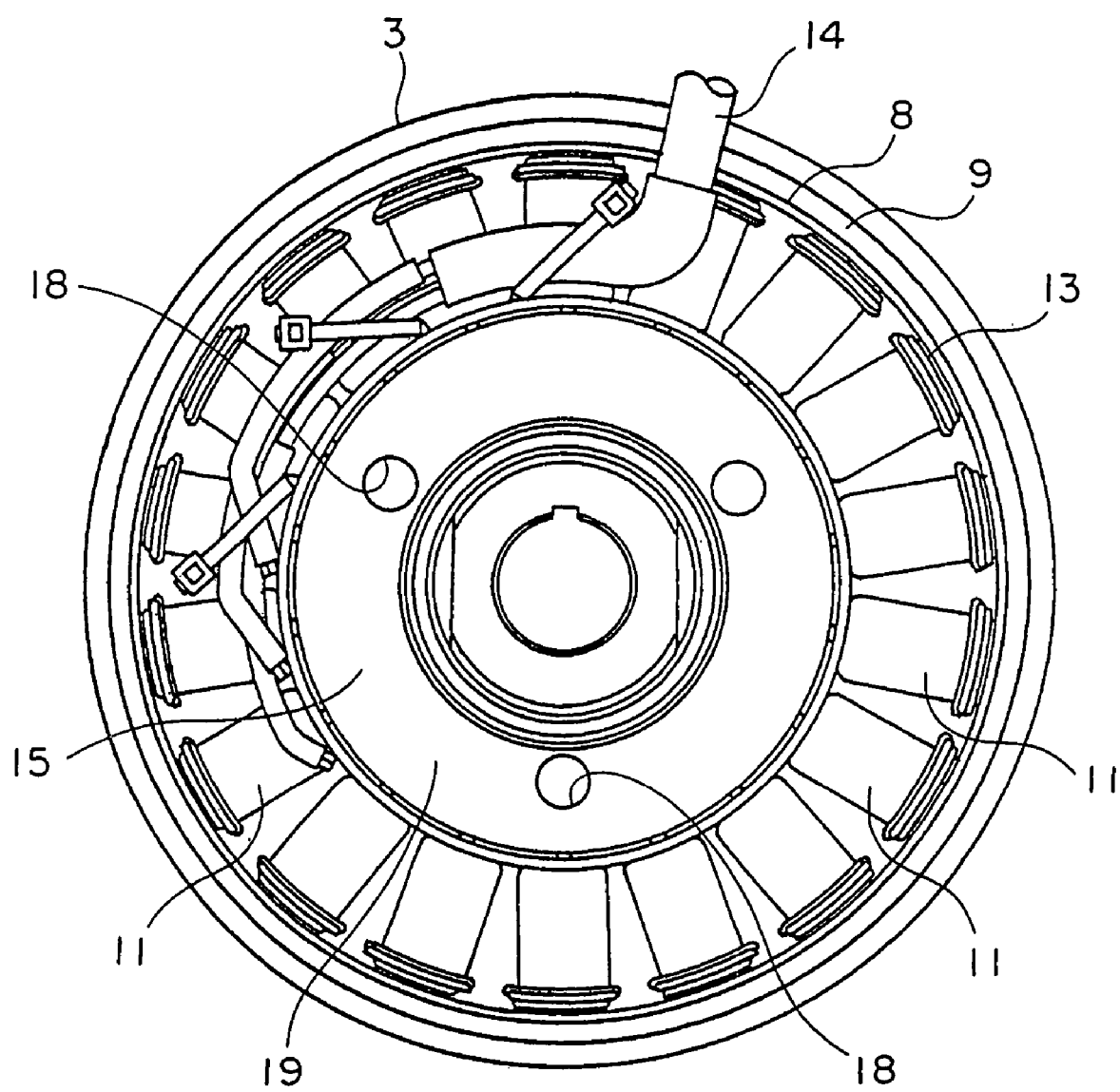
FIG. 2 is a left side view of the magneto generator of FIG. 1.

FIG. 1 is a vertical cross sectional view of a magneto generator according to a first embodiment of the present invention, and FIG. 2 is a left side view thereof.

This magneto generator is provided with a rotor 1 operatively coupled with an internal combustion engine and a stator 2 disposed in a face-to-face relation with the rotor 1.

The rotor 1 has a bowl-shaped flywheel 3 which includes an outer peripheral cylindrical portion 4, a boss portion 5 at an inner side of the cylindrical portion 4, a bottom portion 6 bridging the cylindrical portion 4 and the boss portion 5. The flywheel 3 rotates about an axis of rotation A—A. The boss portion 5 is fixedly secured to a rotation shaft (not shown) which is driven to rotate by the internal combustion engine.

A plurality of permanent magnets 7 are fixedly secured to the inner peripheral surface of the cylindrical portion 4 of the flywheel 3. The plurality of permanent magnets 7 are disposed at mutually equal angular intervals around the axis of rotation A—A. The plurality of permanent magnets 7 are arranged in such a manner that adjacent ones are magnetized to mutually opposite polarity, whereby in a space at inner peripheral sides of the permanent magnets 7, there are generated magnetic fields whose directions change alternately.

A cylindrical guard ring 8 is fitted into the inner peripheral surfaces of the respective permanent magnets 7 in intimate contact therewith. A compound or molding material 9 is filled into spaces at the opposite ends of each permanent magnet 7 in the direction of the axis of rotation A—A as well as clearances between the circumferentially mutually adjacent ends of the permanent magnets 7, so that the plurality of permanent magnets 7 and the guard ring 8 are fixedly secured to the inner peripheral surface of the cylindrical portion 4 of the flywheel 3 by means of the molding material 9.

The stator 2 is mounted on and fixedly secured to an unillustrated stationary or fixed member.

The stator 2 includes a hollow cylindrical stator core 10 and a plurality of magneto coils 11. The stator core 10 is formed on its outer periphery with a plurality of radially outwardly extending teeth 12 arranged at equal intervals in a circumferential direction thereof.

A conductive wire in the form of a copper wire is wound around the side surface of each tooth 12 to form a corresponding magneto coil 11. The respective magneto coils 11 are mutually connected with one another by means of connecting leads 14.

The stator core 10 having the plurality of teeth 12 formed on the outer peripheral portion thereof comprises a laminated core 15, which is formed of a lot of hollow magnetic thin sheet steel plates in the form of cold rolled steel sheet plates laminated or stacked one over another in a direction of the axis of rotation A—A, and a first end plate 16 and a second end plate 17, which are superposed on the opposite side surfaces, respectively, of the laminated core 15 in intimate contact therewith.

The first and second end plates 16, 17 have their outer peripheral portions bent toward the magneto coil sides so as to hold magneto coils 11 in place, and they are made of an aluminum material (A2017-T4) that is a heat radiation material.

A plurality of through holes 18, which penetrate the laminated core 15 and the first and second end plates 16, 17 in parallel to the axis of rotation A—A, are formed in the radially inner portion of the laminated core 15 and the first and second end plates 16, 17. The laminated core 15 and the first and second end plates 16, 17 on the opposite side surfaces of the laminated core 15 are integrated by bolts (not shown) penetrating through the through holes 18 and nuts (not shown) threaded on the end portions of the bolts.

Figure 3:
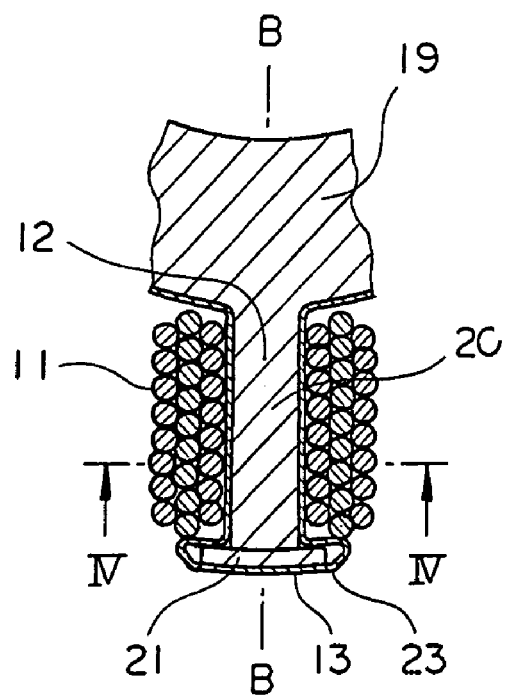
FIG. 3 is a cross sectional view of FIG. 1, around teeth.
Figure 4:
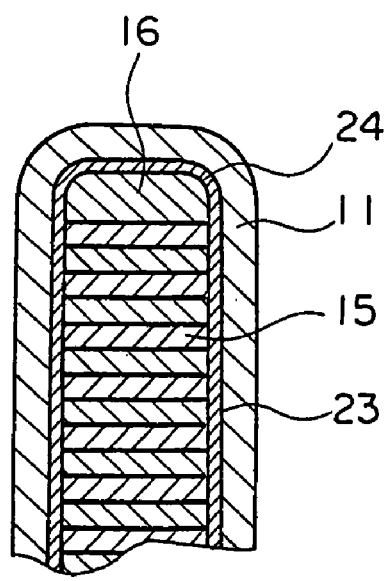
FIG. 4 is a cross sectional arrow view along line IV—IV in FIG. 3.

FIG. 3 is a cross sectional view around one certain tooth 12 of FIG. 1, and FIG. 4 is a cross sectional view along line IV—IV of FIG. 3.

In FIG. 3, a center line B—B is a line that extends from the axis of rotation A—A in a diametral direction.

The stator core 10 has an annular portion 19 surrounding the axis A—A, and each tooth 12 protrudes outward from the annular portion 19 along the center line B—B. Each tooth 12 has a straight portion 20 extending in a diametral direction along the center line B—B, and a flange portion 21 projecting from a tip end of the straight portion 20 on the opposite sides thereof in a circumferential direction.

An insulation film 23 is applied to the straight portion of each tooth 12 and a circular arc surface of the flange portion 21 thereof opposing the guard ring 8 through a minute space for electrically insulating them from a corresponding magneto coil 11. Each magneto coil 11 is formed by winding a copper wire around the outer periphery of a corresponding straight portion 20 between the annular portion 19 and a corresponding flange portion 21.

Copper wires, which are conductive wires, are wound around the first end plate 16 and the second end plate 17, as shown in FIG. 4, and each magneto coil 11 is formed into and held at a prescribed configuration by means of the rigidity of these end plates 16, 17. The edge portions of the first and second end plates 16, 17 at a side opposite the laminated core 15 are chamfered to form rounded corner portions 24. Since the magneto coils 11 are formed by winding copper wires around the rounded corner portions 24 of the first and second end plates 16, 17, it is possible to prevent damage to the copper wires 11 during the winding operation thereof, thus improving the insulation of the first and second end plates 16, .17 against the magneto coils 11 at the corner portions 24.

In the magneto generator as constructed above, the flywheel 3 is operably connected with, and is rotated by, the unillustrated rotation shaft which is driven to rotate by the internal combustion engine. In accordance with the rotation of the flywheel 3, electric power is generated in the magneto coils 11 by the alternating fields which are brought about by the permanent magnets 7. An AC output thus generated is commutated or rectified by an unillustrated rectifier diode, and fed to a load such as a battery mounted on a vehicle.

According to the magneto generator of this embodiment, the first and second end plates 16, 17, made of non-magnetic aluminum plates, do not contribute to power generation in comparison with the case where they are made of steel plates, but the aluminum plates are about 2.1 times as large in specific heat as the steel plates, and are also about 5 times as large in thermal conductivity as the steel plates, as a result of which the heat generated in the laminated core 15 by hysteresis losses and eddy-current losses is efficiently discharged into the outside air, thus making it possible to suppress a rise in temperature of the stator core 10 and to reduce the generation of heat due to the copper or ohmic loss of the magneto coils 11. Consequently, in comparison with the above-mentioned known alternator, the magneto generator of this embodiment is able to provide an amount of electricity (output current) equal to or greater than that in the known alternator.

In addition, the outer peripheral portions of the first and second end plates 16, 17 are each bent into the form of the letter L, so that the magneto coils 11 are held by these bent portions.

Figure 5:
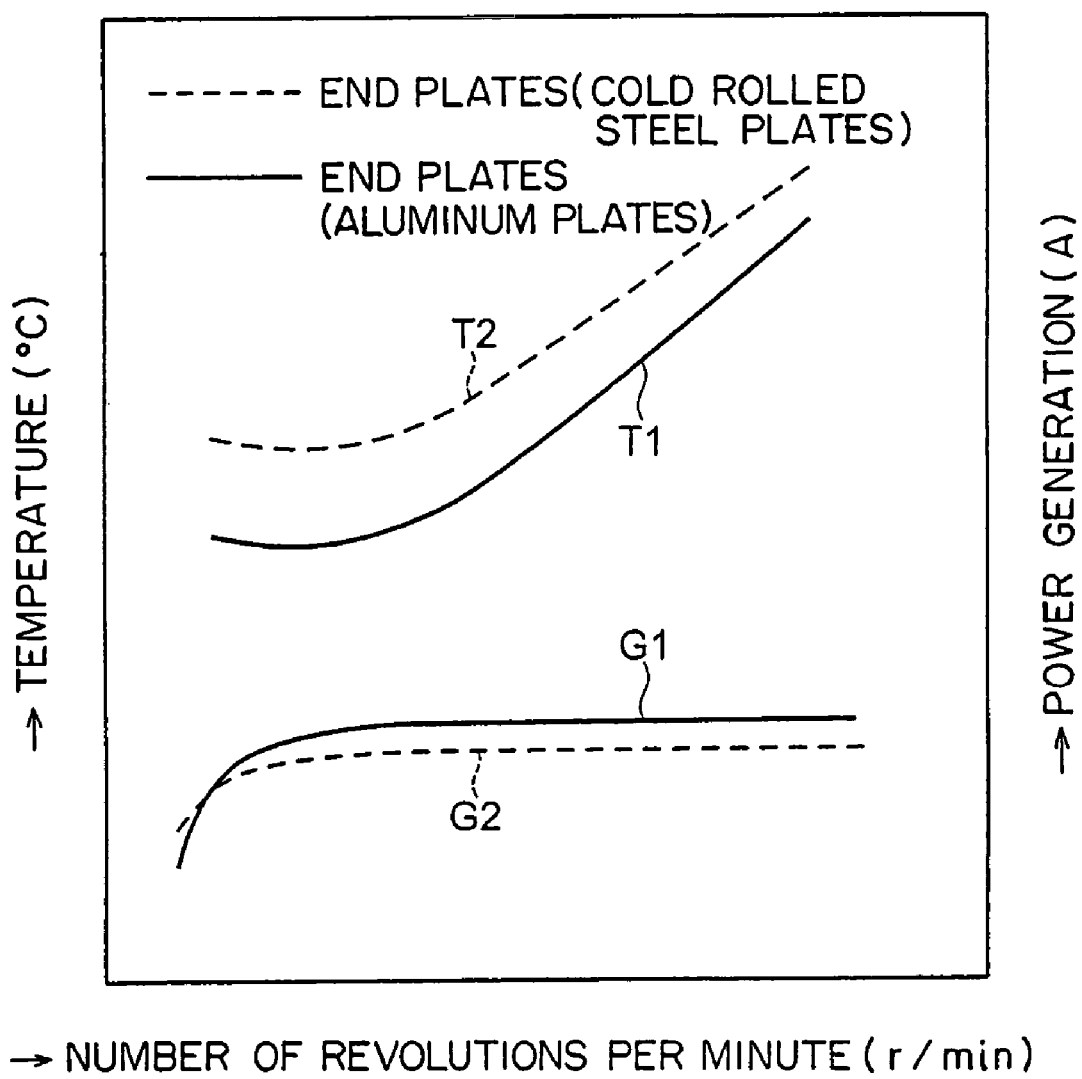
FIG. 5 is a view showing the temperature characteristic of a stator iron core of the magneto generator and the power generation characteristic of magneto coils according to the first embodiment of the present invention.

FIG. 5 shows the temperature characteristic (heat generation characteristic) T1 of the stator core 10 of the magneto generator and the power generation characteristic (output current characteristic) G1 of the magneto coils 11 according to the first embodiment, which were obtained by the present inventor through experiments.

In FIG. 5, the axis of abscissa represents the number of driving revolutions per minute (r/min) of the magneto generator, whereas an axis of ordinate at the left-hand side represents the temperature (° C.) of the stator core 10, and an axis of ordinate at the right-hand side represents the output current (A) of the magneto coils 11. For the purpose of comparison, there is shown a comparison example of a magneto generator with the first and second end plates being made of cold rolled steel sheet as in the case of the laminated core 15, and the temperature characteristic thereof is denoted by T2, and the power generation characteristic thereof is denoted by G2.

The temperature of heat generation (iron loss+copper loss) at each number of revolutions per minute shows the saturation temperature, the absolute value of which may vary to a more or less extent depending upon the cooling efficiency of the flywheel 3, but there can be seen a clear temperature difference between the end plates 16, 17 of aluminum plates and those of steel plates. Moreover, irrespective of the use of the aluminum plates that are non-magnetic and does not contribute to power generation, the temperature rise of the stator core 10 can be reduced. As a result, it is understood that the amount of electricity generated has been increased as mentioned above.

Embodiment 2

Figure 6:
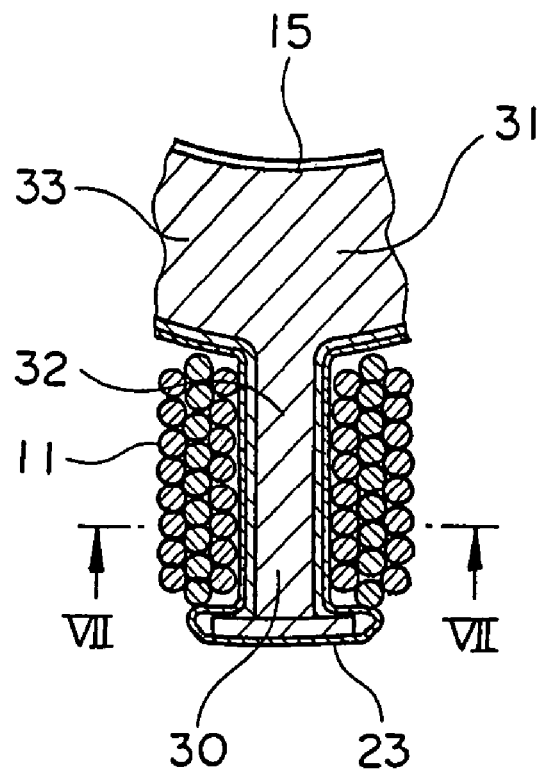
FIG. 6 is a cross sectional view of essential portions of a magneto generator according to a second embodiment of the present invention.
Figure 7:
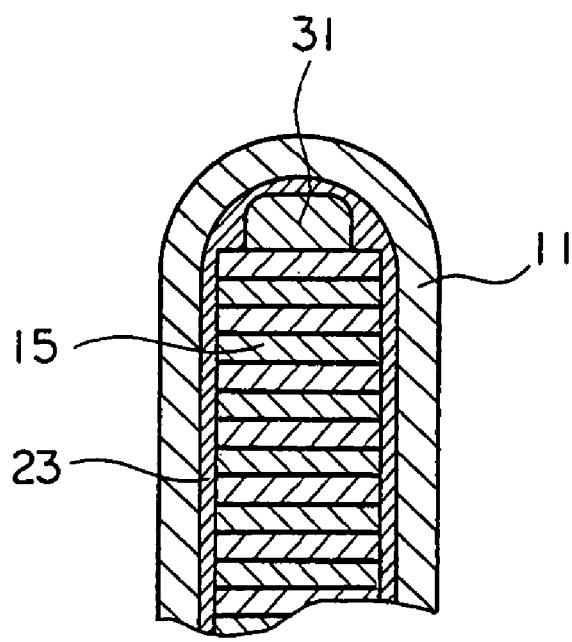
FIG. 7 is a cross sectional arrow view along line VII—VII in FIG. 6.

FIG. 6 is a cross sectional view showing essential portions of a magneto generator according to a second embodiment of the present invention, and FIG. 7 is a cross sectional view along line VII—VII of FIG. 6.

In this embodiment, in a straight portion 32 of each tooth 30 of a stator core 10, the circumferential width of each of a pair of end plates 31 in a rotational direction about the axis of rotation A—A is smaller than the circumferential width of a laminated core 15. In addition, in an annular portion 33 of the stator core 10, the diametral length of each end plate 31 with respect to the axis of rotation A—A is smaller than the diametral length of the laminated core 15.

The construction of this second embodiment other than the above is similar to that of the first embodiment.

The material for the end plates 31 used in this second embodiment is the same aluminum material (A2017-T4) as that used in the first embodiment. In case of the same thickness, this aluminum plates have a tensile strength of about 1.3 times as large as that of known steel plates (i.e., cold rolled steel plates such as SPCC). Therefore, in comparison with the conventional end plates, the end plates 31 with a sectional area of about 75% of the conventional ones provide a strength equivalent to that of the conventional ones under the same strength.

Accordingly, it becomes possible to make the circumferential width of the straight portion 32 of each tooth 30 of each end plate 31 narrower than that of each magnetic sheet steel plate constituting the laminated core 15, and hence the material weight of each end plate 31 can be reduced as compared with that of the first embodiment. As a result, the amount of copper wires used when they are wound around the teeth 30 can also be decreased.

Here, note that other than decreasing the width of the straight portion of each tooth of each end plate 31 by using an end plate material whose tensile strength is higher than sheet steel, the thickness of each end plate for example may be made smaller in relation to the installation space of the magneto generator. Moreover, the surface area of each end plate may be decreased by increasing the inner diameter of the annular portion thereof.

In the above-mentioned first and second embodiments, the pair of end plates are made of the same aluminum plates, and have the same shape and the same thickness, but only one of the end plates, for which heat radiation is particularly required depending upon the installation environment of the magneto generator, may be made of aluminum plates.

Further, the heat radiation material to be used for the end plates is not limited to aluminum such as the one (A2017-T4), but any material whose heat radiation is better than that of magnetic sheet steel may be used for that purpose. For example, it is preferable to use new or nickel silver such as one (C7521), that is higher in tensile strength than sheet steel.

The magneto generator can be installed on a relatively light vehicle such as a motorcycle, an outboard marine engine, a snowmobile or the like, so that it is driven by an internal combustion engine or the like installed thereon to serve for a variety of usage such as charging a battery, feeding power to various loads, etc.

While the invention has been described in terms of preferred embodiments, those skilled in the art will recognize that the invention can be practiced with modifications within the spirit and scope of the appended claims.

What is claimed is:

1. A magneto generator comprising:
a flywheel having a cylindrical portion and being rotatable about an axis of rotation;
a plurality of magnets mounted on an inner peripheral surface of said flywheel so as to rotate therewith;
a stator core having a plurality of teeth protruded outwardly in a diametral direction and being disposed in opposition to said magnets; and
magneto coils with conductive wires wound around said teeth, wherein said stator core has a laminated core formed of a plurality of magnetic sheet steel plates laminated one over another, and a pair of end plates disposed so as to sandwich opposite side surfaces of said laminated core;
at least one of said pair of end plates is made of a metallic material whose heat radiation is higher than that of said magnetic sheet steel plates; and
at least one of said end plates among said teeth of said stator core has a circumferential width in a rotational direction around said axis of rotation smaller than a circumferential width of said laminated core.

2. The magneto generator as set forth in claim 1, wherein said metallic material comprises aluminum (A2017-T4).

3. The magneto generator as set forth in claim 1, wherein said teeth are formed so that the magneto coils are wound fully around an arrangement of the laminated core and the pair of end plates.

4. The magneto generator as set forth in claim 3, wherein an insulation film is arranged between said magneto coils and the arrangement of the laminated core and the pair of end plates.

5. The magneto generator as set forth in claim 1, wherein the at least one of said pair of end plates comprises rounded corner portions on a side facing said magneto coils.

6. A magneto generator comprising:
a flywheel having a cylindrical portion and being rotatable about an axis of rotation;
a plurality of magnets mounted on an inner peripheral surface of said flywheel so as to rotate therewith;
a stator core having a plurality of teeth protruded outwardly in a diametral direction and being disposed in opposition to said magnets; and magneto coils with conductive wires wound around said teeth, wherein said stator core has a laminated core formed of a plurality of magnetic sheet steel plates laminated one over another, and a pair of end plates disposed so as to sandwich opposite side surfaces of said laminated core;

at least one of said pair of end plates is made of a metallic material whose heat radiation is higher than that of said magnetic sheet steel plates;

at least one of said pair of end plates comprises rounded corner portions on a side facing said magneto coils; and at least one of said end plates among said teeth of said stator core has a circumferential width in a rotational direction around said axis of rotation smaller than a circumferential width of said laminated core.

7. The magneto generator as set forth in claim 6, wherein said metallic material comprises aluminum (A2017-T4).

8. The magneto generator as set forth in claim 6, wherein said teeth are formed so that the magneto coils are wound fully around an arrangement of the laminated core and the pair of end plates.

9. The magneto generator as set forth in claim 8, wherein an insulation film is arranged between said magneto coils and the arrangement of the laminated core and the pair of end plates.

* * * * *